Patented July 17, 1923.

1,461,831

UNITED STATES PATENT OFFICE.

FRITZ QUADE, OF BERLIN, GERMANY.

PROCESS OF MANUFACTURING COMPOUNDS SOLUBLE IN WATER OF DIETHYLBARBITURIC ACID AND ITS HOMOLOGUES.

No Drawing. Application filed November 9, 1921. Serial No. 514,077.

*To all whom it may concern:*

Be it known that I, FRITZ QUADE, a citizen of the Republic of Germany, residing at Berlin, Germany, have invented certain new and useful Improvements in Process of Manufacturing Compounds Soluble in Water of Diethylbarbituric Acid and Its Homologues, of which the following is a specification.

Diethyl-barbituric acid known as a opiate and its homologues do not possess any soothing effects. To overcome sleeplessness, partly due to feelings of discomfort it is essential to take large doses of this remedy which is not quite harmless to the human body. There is therefore a necessity to combine the diethyl-barbituric acid or the more easily absorbed and therefore more quickly acting sodium salt with soothing, pain sedative and if possible harmless products. Amongst these are the first to be considered the salts of the acetylsalicylic acid which do not affect the stomach and are easily absorbed.

It was, however, found that a mixture of sodium diethyl-barbiturate with salts of the acetyl-salicylic acid sinters, separates acetic acid, and shows indications of decomposition, obviously on account of the formation of the hygroscopic and easily decomposable sodium acetyl-salicylate.

This drawback may be obviated by using for the mixtures novel salts of the diethyl-barbituric acid which have not been described hitherto and are obtained with the alkali-earths. These salts are such which can not be formed easily as the sodium diethyl-barbiturate and also do not decompose so easily, for instance during the concentration by evaporation.

If freshly precipitated calcium carbonate is treated with a solution of the diethyl-barbituric acid no transformation takes place, nor does crystallized magnesium carbonate react with diethyl-barbituric acid. However, freshly precipitated magnesium carbonate, not yet in crystalline state reacts with the diethyl-barbituric acid, but the solution thus formed decomposes when being concentrated by evaporation upon a water-bath. There is formed a difficultly soluble product, which after the decomposition by mineral acids gives a diethyl-barbituric acid which has a fusing point far lower than the original diethyl-barbituric acid. If, however, a solution of magnesium diethyl-barbiturate, which has been obtained by introducing freshly precipitated magnesium carbonate, that has not yet assumed the crystalline state, into a hot saturated solution of diethyl-barbituric acid purified by filtration and the mixture is then concentrated by evaporation under a vacuum, a salt with a little more than 6% of magnesium and tolerably easily soluble in water is obtained. To obtain a product which is soluble in water it is important that not much more of the magnesium compound is employed than corresponds to the amount of magnesium to be expected in the final product according to theory, viz, 5° .15%. It is also possible to manufacture the salt from magnesium hydroxide if the solution obtained is evaporated under a vacuum.

The soluble lime salt with 10% of Ca (theory 99%) is obtained by digesting a solution of diethyl-barbituric acid with calcium hydroxide with the aid of heat, and drying the filtrate under a vacuum.

The new earth-alkali-salts of the diethyl-barbituric acid so obtained, are easily absorbed and are soluble in water. They give durable mixtures with the earth-alkali-salts of the acetyl-salicylic acid, among which those products that contained solely magnesium salts, give the most suitable tabloids.

Soluble salts may be obtained by means of the same process also from homologues of the diethyl-barbituric acid for instance from phenyl-ethyl-barbituric acid.

*Example.*—184 parts of the diethyl-barbituric acid are dissolved by heating in the twelvefold quantity of water and 30 parts (calculated in the dry state) of freshly precipitated magnesium-hydroxide are suspended in a little water and added gradually. The solution which is filtered off from a slight sediment, is concentrated by evaporation and dried under a vacuum at as low a temperature as possible.

Already at ordinary temperature one part of the salt dissolves in 30 parts of water, but at the temperature of the human body (37°) the solubility is considerably greater.

Having thus particularly described the nature of my invention, what I claim as new and desire to secure by Letters Patent of the United States is:

1. Process of manufacturing water soluble compounds of disubstituted barbituric acid, which process consists in digesting a solution of the disubstituted barbituric acid with the theoretical quantity of an akali earth metal compound and concentrating the filtered solution by evaporation.

2. Process of manufacturing water soluble compounds of disubstituted barbituric acid, which process consists in digesting a solution of the disubstituted barbituric acid with the theoretical quantity of an akali earth metal compound and concentrating the filtered solution by evaporation under a vacuum to dryness.

3. Process of manufacturing water soluble compounds of disubstituted barbituric acid, which process consists in digesting a solution of the diethylbarbituric acid with the theoretical quantity of an alkali earth metal compound and concentrating the filtered solution by evaporation under a vacuum to dryness.

4. Process of manufacturing water soluble compounds of disubstituted barbituric acid, which process consists in digesting a solution of the diethylbarbituric acid with the theoretical quantity of magnesium carbonate and concentrating the filtered solution by evaporation under a vacuum to dryness.

5. Process of manufacturing water soluble compounds of disubstituted barbituric acid, which process consists in digesting a solution of the diethylbarbituric acid, with the theoretical quantity of a freshly precipitated magnesium carbonate and concentrating the filtered solution by evaporation under a vacuum to dryness.

6. As new products the herein described water soluble alkali-earth-metal salts of disubstituted barbituric acid.

In testimony whereof I affix my signature.

FRITZ QUADE.